Sept. 23, 1958    L. H. FLORA ET AL    2,853,113
BOLT HOLDER FOR USE WITH PANEL HAVING A KEY HOLE SLOT
Filed April 26, 1954

INVENTORS
LAURENCE H. FLORA
JOHN BALINT

BY *R. S. Lombard*
ATTORNEY

United States Patent Office 2,853,113
Patented Sept. 23, 1958

2,853,113

BOLT HOLDER FOR USE WITH PANEL HAVING A KEY HOLE SLOT

Laurence H. Flora and John Balint, Cleveland, Ohio, assignors to Tinnerman Products, Inc., Cleveland, Ohio, a corporation of Ohio Application April 26, 1954, Serial No. 425,409

2 Claims. (Cl. 151—41.75)

This invention relates in general to bolt or screw fastened assemblies and deals, more particularly, with improvements in fastening devices in which a holder or retainer is employed to attach a standard bolt, screw, rivet, or similar headed stud in fastening position in an assembly prior to the application of a cooperating nut device thereto for securing the parts of the assembly.

In United States Patents 2,636,533 and 2,644,502, there are disclosed various forms of fastening devices comprising a bolt holder or retainer which is provided as a relatively simple and low cost one-piece sheet metal clip, or the like, comprising a portion which fits onto the head of the bolt or other stud and integral clip type attaching elements that are easily and quickly applied to engage marginal portions of the bolt hole in a supporting panel to retain the bolt or other stud in attached position.

It is often necessary or desirable to attach such fastening devices in an assembly in which the rearward side of the supporting panel is not conveniently or readily accessible, whereupon the attachment must be effected by an operation taking place entirely from the outer or forward side of the supporting panel.

A primary object of this invention, therefore, is to provide an improved fastening device of the kind referred to comprising a bolt holder which is adapted to be attached in a panel aperture by such an operation taking place entirely from the outer or forward side of said panel, in a procedure wherein the bolt head and the portion of the holder fitted thereon are adapted to pass through the panel aperture to abutting relation with the rearward side of the panel in attached position, with the clip type attaching means of the holder including a retaining portion for engaging the wall of the panel aperture to lock the bolt and bolt holder in such attached position in the panel aperture.

A further object of the invention is to provide an improved fastening device comprising a bolt holder of this character which is adapted to be attached in an aperture in a supporting panel by an operation taking place entirely from the outer or forward side of said panel in a procedure wherein the bolt head and the portion of the holder fitted thereon are adapted to pass through said panel aperture and seat in a smaller size slot adjoining said aperture in abutting relation with the rearward side of the panel in attached position, and with the clip type attaching means of the holder engaging marginal portions of said slot together with a portion of said holder defining a shoulder or detent received in said panel aperture to lock the bolt and bolt holder in said attached position.

Another object of the invention is to provide a fastening device comprising such a bolt holder in which said portion thereof defining the shoulder or detent that is received in the panel aperture is formed in a shape corresponding substantially to the contour of the panel aperture to substantially close said panel aperture in the attached position of the bolt holder.

A further object of the invention is to provide an improved fastening device embodying a bolt holder, such as described, comprising a one-piece sheet metal clip device, or the like, which is adapted to be easily and quickly applied to attached fastening position in a panel aperture, as aforesaid, to hold the bolt in attached fastening position while otherwise retaining the bolt against axial displacement and/or turning as the associated nut is threaded thereon and tightened.

Further objects and advantages and other new and useful features in the construction, arrangement and general combination of elements of the invention will be apparent as the following description proceeds with reference to the accompanying drawings, for purposes of illustration but not of limitation, in which like reference characters designate like parts throughout, and in which.

Figure 1:
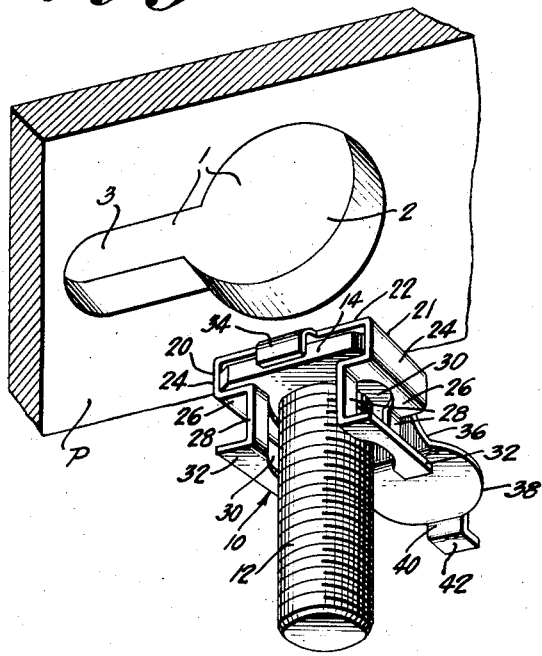
Fig. 1 is a perspective view showing a fastening device in accordance with the invention in position to be applied to an aperture in a panel to attach the bolt in fastening position on the panel by an operation taking place entirely from the forward side of the panel.
Figure 2:
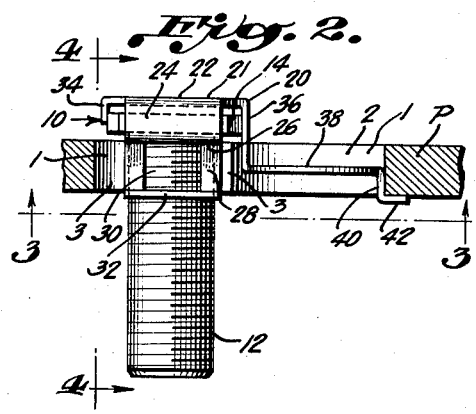
Fig. 2 is a vertical sectional view through the panel showing the fastening device in attached position in the aperture in the panel.
Figure 5:
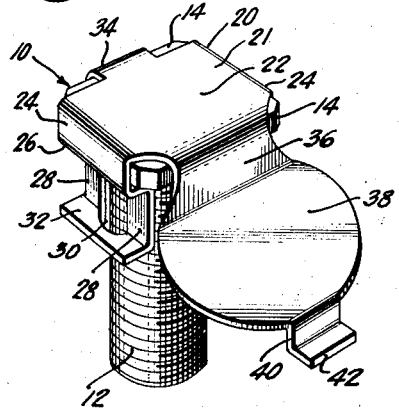

Referring now, more particularly, to the drawings, Figs. 1 and 5 show a fastening device 10, in accordance with the invention, comprising a bolt 12 and bolt holder 20, adapted to be attached in an aperture 1 in a supporting panel or plate P, Fig. 1, by an operation taking place entirely from the forward side of said panel P as is required in what is known as a blind fastening assembly, for example. To this end, the panel aperture 1, Fig. 1, is provided in a generally key-hole type of opening comprising a circular hole 2 merging with a smaller slot 3 extending radially therefrom and defining the location that the bolt 12 is to project from the forward side of the panel P in attached position. In general, the arrangement is such that the bolt head 14 and the associated portion of the bolt holder 20 may be readily passed through the larger circular hole 2 of the panel aperture 1 from the forward side of said panel P, and then slipped into the smaller slot 3 in attached position, Figs. 2 and 3, where the bolt head 14 is in abutting relation with marginal portions of said slot 3 at the rearward side of the panel P while the bolt shank 12 projects from the forward side of said panel P in position for application thereto of the usual nut or nut device for securing a cooperating part to said panel P.

The panel P may be of any suitable metal, wood, plastic or fiber board construction, or the like, but inasmuch as the invention is used mainly in metallic structures, said panel P is usually in the form of a metal panel or plate in which the keyhole type of aperture 1 may be punched or otherwise provided just as readily as the usual bolt hole is formed therein.

The bolt holder 20 is a relatively simple sheet metal article of manufacture that may be provided for use with practically any type of bolt head or other headed stud. In the present example, the sheet metal bolt holder 20 is shown as provided for a standard bolt 12 having a square head 14 formed with bevelled corners. Any suitable sheet metal may be employed for making the bolt holder 20, preferably that of a spring metal nature such as spring steel or cold rolled steel having spring-like characteristics.

The sheet metal section forming the bolt holder 20 is provided in a substantial cage 21 comprising a cap portion 22 overlying the bolt head 14 together with downwardly bent side walls 24 snugly engaging the side faces of the bolt head and bent into inwardly extending flanges 26 engaging the underside of said bolt head 14. Arms 28 extend from said inwardly bent flanges 26 along the length of the shank 12 of the bolt in close abutting relation thereto. Peferably said arms 28 have their intermediate portions formed with cutouts 30 of such size as to clear adjacent curved portions of the bolt shank 12 to provide a relatively smaller and closer fit of said arms 28 against said bolt shank 12. The ends of said arms 28 are bent into outwardly extending attaching hooks or tongues 32 which cooperate with the inwardly bent flanges 26 in engaging opposite surfaces of marginal portions of the slot 3 in the panel P in the attached position of the fastening device, as presently to be described.

A lug 34 on one end of the cap portion 22 is bent downwardly therefrom for engagement with an adjacent end face of the bolt head 14 while the opposite end of said cap portion 22 includes an integral connecting web 36, or the like, which is also bent downwardly from said cap portion 22 for engagement with the opposite end face of said bolt head 14. The bolt holder 20 thus defines a substantial cage 21 comprising the cap portion 22 overlying the bolt head 14 with the side walls 24 engaging opposite side faces of said bolt head, the inturned flanges 26 engaging the underside thereof, and the lug 34 and web 36, respectively, engaging the opposite end faces of said bolt head 14 in a fixed, nonrotatable connection therewith. A cage of this character is advantageously provided in the bolt holder 20 inasmuch as such a cage is admirably suited for automatic machine assembly with the bolt head 14 as a combined unit when the bolt holder is bent and formed in the fabrication thereof. In instances where the bolt holder 20 is produced as a separate article and later assembled with the bolt 12, the bolt head 14 is easily and quickly assembled in such a cage simply by canting the bolt head 14 with reference to the resilient arms 28 as said arms 28 are spread apart as necessary to permit the bolt head 14 to slip therebetween and seat on the inturned flanges 26 of the cage 21 with its side faces in engagement with the side walls 24 of the cage and its end faces engaging the lug 34 and web 36, respectively, in a fixed, nonrotatable connection of the bolt head 14 within said cage 21, as aforesaid.

Figure 3:
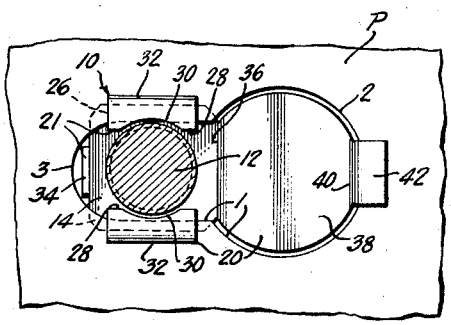
Fig. 3 is a sectional view of Fig. 2 on line 3—3, looking in the direction of the arrows.

The free end of the holder 20 adjoining the web 36 extends laterally outwardly therefrom in the form of an extension defining a retaining portion 38 which is adapted to lock the fastening device 10 in attached position in the panel aperture 1. The retaining portion 38 is downwardly offset from the bolt head 14 to extend in substantially a plane between the inturned flanges 26 and the attaching hooks or tongues 32, and preferably has a disc-like shape corresponding to but slightly smaller than said circular hole portion 2 of the panel aperture 1 so as to be readily received therein while also closing the major portion of said hole 2 in the attached position of the fastening device, as seen in Fig. 3. The peripheral edge of said disc-like retaining portion 38 actually defines a continuous shoulder or abutment within the hole 2 which prevents reverse movement of the fastening device 10 in the direction for removal from attached position in said panel aperture 1. Preferably, the extreme end of said disc-like retaining portion 38 is formed with a reduced size strip projecting therefrom which is bent to provide a pronounced detent or latching shoulder 40 and an adjoining outwardly directed tab 42. Said detent or latching shoulder 40 is adapted for abutting relation with a substantial thickness of the adjacent wall of the hole 2 to lock the fastening device in attached position in the panel aperture 1, while said tab 42 seats against the outer surface of said panel P in engagement with a marginal portion of the hole portion 2 to retain said detent or shoulder 40 in applied position and otherwise prevent said retaining portion 38 from becoming displaced by passing through said hole 2 to the rearward side of the panel P.

Figure 4:
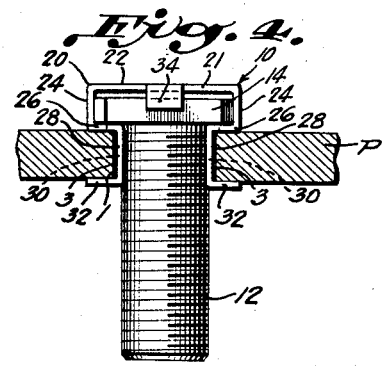
Fig. 4 is a sectional view of Fig. 2 on line 4—4, looking in the direction of the arrows; and, Fig. 5 shows the fastening device in perspective in a view substantially opposite to that of Fig. 1.

With the fastening device 10 provided as shown in Figs. 1 and 5 in the form of a combined unit of the bolt 12 and the sheet metal holder 20, as aforesaid, the fastening device is easily and quickly attached in the panel aperture 1 by an assembling operation taking place entirely from the forward side of the panel P and without need for special tools or other assembling devices. In such assembling operation, the bolt shank 12 is held at its free end to pass the bolt head 14 and associated cage portion 21 of the holder through the circular hole 2 of the panel aperture 1 to a position in which the arms 28 of the holder and the bolt shank 14 are aligned with the open end of the smaller slot 3 of the panel aperture 1, with the inturned flanges 26 adjacent the rearward side of said panel P and the hooks or tongues 32 adjacent the forward side of said panel P, as illustrated in Fig. 4. In this initial application of the fastening device 10, the offset retaining portion 38 extends laterally beyond the hole 2 and is fixed slightly outwardly in engagement with the forward side of panel P adjacent said hole 2.

The fastening device is then moved laterally toward the smaller slot 3 to its fully attached position in which the bolt shank 14 is received in said slot 3 with the adjacent arms 28 of the cage 21 disposed in nonrotatable abutting relation to the side walls of said slot 3, as shown in Figs. 3 and 4. The inturned flanges 26 of said cage 21 are simultaneously seated on the rearward surface of said panel P in engagement with marginal portions of said slot 3, while the attaching hooks or tongues 32 assume a similar position in engagement with marginal portions of said slot 3 at the forward side of said panel P. At the same time, the disc-like retaining portion 38 moves into the area of the circular hole 2 and is received therein with its peripheral edge in abutting relation to the wall of said hole 2, as shown in Figs. 3 and 4, thereby locking the fastening device 10 in fully attached position in the panel aperture 1 against reverse movement in the direction for removal from said aperture 1. In the preferred construction, said retaining portion 38 includes the pronounced latching shoulder or detent 40 and tab 42 in an arrangement in which said shoulder or detent 40 seats in positive abutting relation to a material thickness of the wall of the hole 2 while said tab 42 engages the forward side of the panel adjacent said hole 2 to retain said pronounced shoulder or detent 40 in such positive abutting relation with the wall of said hole 2. The tab 42 otherwise prevents said retaining portion 38 from passing completely through the hole 2 in any manner in which the entire fastening device 10 might slip through said hole 2 in the attaching operation and fall out of reach at the rearward side of the panel P.

The fastening device 10, accordingly, is substantially locked in its fully attached position by the retaining portion 38 including the pronounced latching shoulder 40 and tab 42, as aforesaid. The bolt head 14 is seated on the inturned flanges 26 of the cage 21 in bearing relation to marginal portions of the slot 3 at the rearward side of the panel P, with the hooks or tongues 32 at the forward side of said panel P preventing rearward axial displacement of the bolt from attached position in said slot 3, while the abutting relation of the arms 28 against the side walls of said slot 3 hold the bolt head 14 against relative turning as the associated nut is turned and tightened on the free end of the bolt shank 12 in securing a cooperating part to said panel P in a completed assembly.

The holder or retainer 20 in the fastening device of the invention preferably is constructed of relatively thin sheet metal the thickness of which is selected according to service requirements and the predetermined size of the bolt or other stud to be employed. The holder or retainer is most effective when provided of spring metal suitably tempered and otherwise treated to give the desired toughness and hardness, particularly in the case of devices intended for use in heavy duty applications. A cheap and highly satisfactory holder or retainer in accordance with the invention may be made from cold rolled metal such as cold rolled steel which is untempered but of a spring metal nature and capable of providing an effective and reliable fastening device as and for the purpose described.

While the invention has been described in detail with a specific example, such example is intended as an illustration only inasmuch as the invention fully contemplates various modifications which may be provided without departing from the spirit and scope of the invention.

What is claimed is:

1. A blind bolt fastening assembly comprising the combination of a panel having a hole and a smaller size slot in the same plane in communication with said hole, a bolt or other headed stud and a sheet metal member defining a cage receiving the head of said bolt in non-rotatable relation thereto, an integral retaining portion extending laterally outwardly from said cage and in the plane of said panel, said cage comprising means non-rotatably engaging the bolt head and inturned flanges engaging the underside of the bolt head, arms depending from the inner ends of said inturned flanges of the cage in engagement with the bolt shank adjacent said bolt head, said arms being provided with cut-outs of such size as to clear adjacent curved portions of the bolt shank to provide a relatively closer fit of said arms against said bolt shank, said arms carrying outwardly directed hooks spaced axially from said inturned flanges, said bolt head and cage being larger than the width of said slot but of a size to pass through said hole in said panel, said bolt head and cage being passed through said hole and positioned over said slot at one side of said panel with said bolt shank and arms received in said slot, said arms being in substantially abutting non-rotatable relation with the confronting walls of said slot, and said outwardly extending hooks engaging the opposite side of said panel adjacent said slot, said retaining portion being of a configuration corresponding substantially to the outline of said hole and being positioned in said hole in generally parallel relation to said flanges and said hooks, said last mentioned portion having shoulder means extending outwardly from said retaining portion in a direction axially of said bolt and coacting in snap fastening interlocking relation with said panel.

2. In a blind bolt fastening assembly, a fastening device for attachment in a panel aperture provided by a hole and a smaller size slot in the same plane in communication with said hole, said fastening device comprising a bolt or other headed stud and a sheet metal member defining a cage comprising side walls engaging and holding opposite sides of the bolt head and having inturned flanges engaging the underside of the bolt head, an integral retaining portion extending laterally ouwardly from said cage and from the bolt shank, arms depending from said inturned flanges of the cage in engagement with the bolt shank adjacent said bolt head, the intermediate portions of each of said arms being formed with cutouts of such size as to clear adjacent curved portions of the bolt shank to provide a relatively closer fit of said arms against said bolt shank, each of said arms carrying outwardly directed hooks spaced from said inturned flanges, said bolt shank and arms adjacent the bolt head having a combined cross-section less than the width of said slot and said outwardly directed hooks being of such size as to overlap adjacent edges of said slot, said bolt head and cage being larger than said slot but of a size adapted to pass through said hole in the panel and to be positioned over said slot at one side of said panel with said bolt shank and arms received in said slot and with said outwardly extending hooks engaging the opposite side of said panel adjoining the edges of said slot, said retaining portion being disposed in generally parallel relation to the planes of said flanges and said hooks and of a configuration corresponding substantially to the outline of said hole and being received therein to substantially close said hole, said retaining portion having a shoulder on the outermost end thereof extending in a direction axially of said bolt and engaging the wall of said opening, and a tab extending outwardly from the free end of said shoulder and engaging said opposite side of the panel.

References Cited in the file of this patent

UNITED STATES PATENTS

| 2,222,449 | Tinnerman | Nov. 19, 1940 |
| 2,495,037 | Tinnerman | Jan. 17, 1950 |
| 2,649,126 | Tinnerman | Aug. 18, 1953 |
| 2,676,635 | Tinnerman | Apr. 27, 1954 |
| 2,704,680 | Bedford | Mar. 22, 1955 |

FOREIGN PATENTS

| 659,926 | Great Britain | Oct. 31, 1951 |